United States Patent
Kameda

(10) Patent No.: US 7,433,989 B2
(45) Date of Patent: *Oct. 7, 2008

(54) ARBITRATION METHOD OF A BUS BRIDGE

(75) Inventor: Kohji Kameda, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/132,180

(22) Filed: May 19, 2005

(65) Prior Publication Data

US 2005/0216646 A1    Sep. 29, 2005

Related U.S. Application Data

(63) Continuation of application No. 09/609,399, filed on Jul. 3, 2000, now Pat. No. 6,910,091.

(30) Foreign Application Priority Data

Jul. 5, 1999    (JP)    ................. 11-190944

(51) Int. Cl.
*G06F 13/36* (2006.01)
(52) U.S. Cl. .................. 710/309; 710/243
(58) Field of Classification Search ........ 710/306, 710/311, 313, 315, 120, 243, 309
See application file for complete search history.

(56) References Cited

U.S. PATENT DOCUMENTS

| 5,805,836 A | 9/1998 | Barnhart et al. |
| 5,859,988 A | 1/1999 | Ajanovic et al. |
| 6,065,122 A | 5/2000 | Wunderlich et al. |
| 6,076,139 A | 6/2000 | Welker et al. |
| 6,094,700 A * | 7/2000 | Deschepper et al. ........ 710/313 |
| 6,131,135 A | 10/2000 | Abramson et al. |
| 6,163,824 A | 12/2000 | Quackenbush et al. |

(Continued)

FOREIGN PATENT DOCUMENTS

EP    924621 A2 *    6/1999

(Continued)

OTHER PUBLICATIONS

"Computer system for allowing sequential access in response to multiple requests for common bus" (Derwent-Acc-No: 1998-021139, Inventor: MacLaren et al., hereinafter MacLaren).*

(Continued)

*Primary Examiner*—Glenn A. Auve
*Assistant Examiner*—Trisha Vu
(74) *Attorney, Agent, or Firm*—Dickstein Shapiro LLP

(57) ABSTRACT

A bus bridge interfaces a primary-side bus with a plurality of secondary-side buses. The primary side bus is a local bus in a system and the secondary-side buses are external buses connected to the system. The bus bridge supports a plurality of kinds of operations one of which is an operation related to a serial bus in accordance with IEEE1394. An access right is given equally to each of the secondary-side buses, when access demands to the primary-side bus are lodged from more than two of the secondary side buses at the same time, by not giving a priority to any one of the secondary side buses.

13 Claims, 2 Drawing Sheets

U.S. PATENT DOCUMENTS

| | | | |
|---|---|---|---|
| 6,205,486 B1 | 3/2001 | Wei et al. | |
| 6,282,045 B1 | 8/2001 | Glover | |
| 6,298,370 B1 * | 10/2001 | Tang et al. | 718/102 |
| 6,347,352 B1 * | 2/2002 | Jeddeloh et al. | 710/243 |
| 6,445,711 B1 * | 9/2002 | Scheel et al. | 370/402 |
| 6,910,091 B1 * | 6/2005 | Kameda | 710/309 |

FOREIGN PATENT DOCUMENTS

| | | |
|---|---|---|
| JP | 09-153009 | 6/1997 |
| JP | 09-293049 | 11/1997 |
| JP | 10-177544 | 6/1998 |

OTHER PUBLICATIONS

"round robin", a definition from Whatis.com, p. 1.*

* cited by examiner

ARBITRATION METHOD OF A BUS BRIDGE

This application is a continuation of application Ser. No. 09/609,399, filed on Jul. 3, 2000, now U.S. Pat. No. 6,910,091, which is hereby incorporated by reference in its entirety.

BACKGROUND OF THE INVENTION

1. Field of the Invention

The present invention generally relates to an arbitration method of a bus bridge and, more particularly, to an arbitration method performed by a bus bridge such as a PCI-PCI bridge of personal computers, a PCI-card bus bridge, a PCI-IEEE1394 (OHCI-Link) bridge, etc.

2. Description of the Related Art

The performance of computers has been accelerated every year, and peripheral devices such as memory devices are sped up and upgraded. The interface used for the computers and the peripheral devices includes the IEEE1394 interface. The IEEE1394 interface is standardized as a high-speed serial bus for the next generation's multimedia by IEEE, which can be extended over the consumer and the computer.

In the IEEE1394 standard, a data transfer rate from 100 Mbps to 400 Mbps is used. The IEEE1394 allows use of an isochronous transfer so as to guarantee a real-time operation using the isochronous transfer. That is, because the priority right is assigned each 125 µs in the isochronous transfer of IEEE1394, the real time operation for the data transfer can be guaranteed.

The above-mentioned IEEE-1394 standard is not for I/O devices but for buses. When the IEEE-1394 standard is used for a system, a bus bridge is provided so as to interface a primary side bus with a secondary side bus, the primary side bus being a local bus in the system.

There might be a case in which only a limited number of bus bridges can be provided in a system, and the number of buses to be connected in the system is greater than the limited number of bus bridges. In such a case, two or more buses may be connected to a single bus bridge by adding a unique ID to each of the buses.

There is a bridge device that interfaces a primary side bus, which is a local bus in the system, with a secondary side bus. Such a bridge device may supports different operations with respect to the bus control. For instance, one of the operations relates to the serial bus according to the IEEE1394 standard and the other operation relates to the bus according to a standard other than the IEEE1394 standard.

When the bus in accordance with the IEEE1394 standard begins accessing the primary side bus, it takes a relatively long time to transfer data. Therefore, the IEEE1394 bus occupies the access right. Moreover, when arbitration is performed, the access right might not be handed over to other secondary side buses when priority is given to the IEEE1394 side.

SUMMARY OF THE INVENTION

It is a general object of the present invention to provide an arbitration method of a bus bridge in which the above-mentioned problems are eliminated.

A more specific object of the present invention is to provide an arbitration method of a bus bridge which equally gives an access right to secondary side buses when the secondary side buses include the IEEE1394 bus so that the secondary side buses other than the IEEE1394 bus is prevented from being not given the access right.

In order to achieve the above-mentioned objects, there is provided according to one aspect of the present invention an arbitration method of a bus bridge which interfaces a primary side bus with a plurality of secondary side buses, the primary side bus being a local bus in a system and the secondary side buses being external buses connected to the system, the bus bridge supporting a plurality of kinds of operations one of which is an operation related to a serial bus in accordance with IEEE1394, the arbitration method comprising the step of giving an access right sequentially to each of the secondary side buses, when access demands to the primary side bus are lodged from more than two of the secondary side buses at the same time, by not giving a priority to any one of the secondary side buses.

According to the present invention, since the access right is given sequentially to each of the secondary side buses, the access right can be given equally to each of the secondary side buses.

In one embodiment, one of the secondary side buses may be the serial bus in accordance with IEEE1394, and the rest of the secondary side buses may be card buses.

The arbitration method according to the present invention may further comprise the step of: giving a priority right to the serial bus in accordance with IEEE1394; and maintaining the access right given to the serial bus in accordance with IEEE1394 when an access demand is lodged from the secondary side buses other than the serial bus in accordance with IEEE1394.

Accordingly, when the serial bus in accordance with IEEE1394 is given an access right, an operation with respect to the serial bus in accordance with IEEE1394 can be completed without interruption even if an access demand is lodged from other secondary buses since the access right is not transferred from the serial bus in accordance with IEEE1394 to other secondary buses. Thus, the operation of the serial bus in accordance with IEEE1394 is prevented from being failed.

In the arbitration method according to the present invention, the secondary side buses may include a plurality of card buses, and the arbitration method may comprise the steps of: performing an arbitration between the serial bus in accordance with IEEE1394 and the card buses when access demands are lodged from the serial bus in accordance with IEEE1394 and the card buses; and performing an arbitration between the card buses when an access right is to be given to one of the card busses. Additionally, the arbitration method may further comprise the step of changing an order of giving the access right.

When the secondary side buses include the serial bus in accordance with IEEE1394 and more than two card buses, an arbitration circuit becomes complex. However, according to the present invention, the arbitration circuit can be simplified by dividing the operation of arbitration into two steps.

In the above-mentioned structure, there may be a case in which the access right cannot be given equally to the serial bus in accordance with IEEE1394 and the card buses. However, the priority can be given equally to each of the secondary side buses by flexibly changing the priority level in the first step. Thus, an efficient arbitration can be achieved in response to a condition of the system.

The arbitration method according to the present invention may further comprise the step of giving a highest priority to the primary side bus when the primary side bus lodges an access demand to the secondary side buses irrespective of a condition of arbitration between the secondary side buses.

According to the above-mentioned invention, the operation of arbitration is prevented from being failed due to a collision of an access from the secondary side buses with an access from the primary side bus. That is, when the arbitration is performed with respect to the secondary side buses, the primary side bus is in an idle state. Accordingly, it is possible that an access from the secondary side buses and a access from the primary side bus are made simultaneously, which may result in an operation error. However, such a problem can be eliminated by giving a highest priority to the primary side bus when the primary side bus lodges an access demand to the secondary side buses.

Additionally, there is provided according to another aspect of the present invention an arbitration method of a bus bridge which interfaces a primary side bus with a plurality of secondary side buses, the primary side bus being a local bus in a system and the secondary side buses being external buses connected to the system, the bus bridge supporting a plurality of kinds of operations one of which is an operation related to a serial bus in accordance with IEEE1394, the arbitration method comprising the step of giving a highest priority to the primary side bus when the primary side bus lodges an access demand to the secondary side buses irrespective of a condition of an arbitration between the secondary side buses.

According to the above-mentioned invention, the operation of arbitration is prevented from being failed due to a collision of an access from the secondary side buses with an access from the primary side bus. That is, when the arbitration is performed with respect to the secondary side buses, the primary side bus is in an idle state. Accordingly, it is possible that an access from the secondary side buses and a access from the primary side bus are made simultaneously, which may result in an operation error. However, such a problem can be eliminated by giving a highest priority to the primary side bus when the primary side bus lodges an access demand to the secondary side buses.

Other objects, features and advantages of the present invention will become more apparent from the following detailed description when read in conjunction with the accompanying drawings.

DETAILED DESCRIPTION OF THE PREFERRED EMBODIMENT

A description will now be given, with reference to FIG. 1, of a first embodiment of the present invention.

Figure 1:
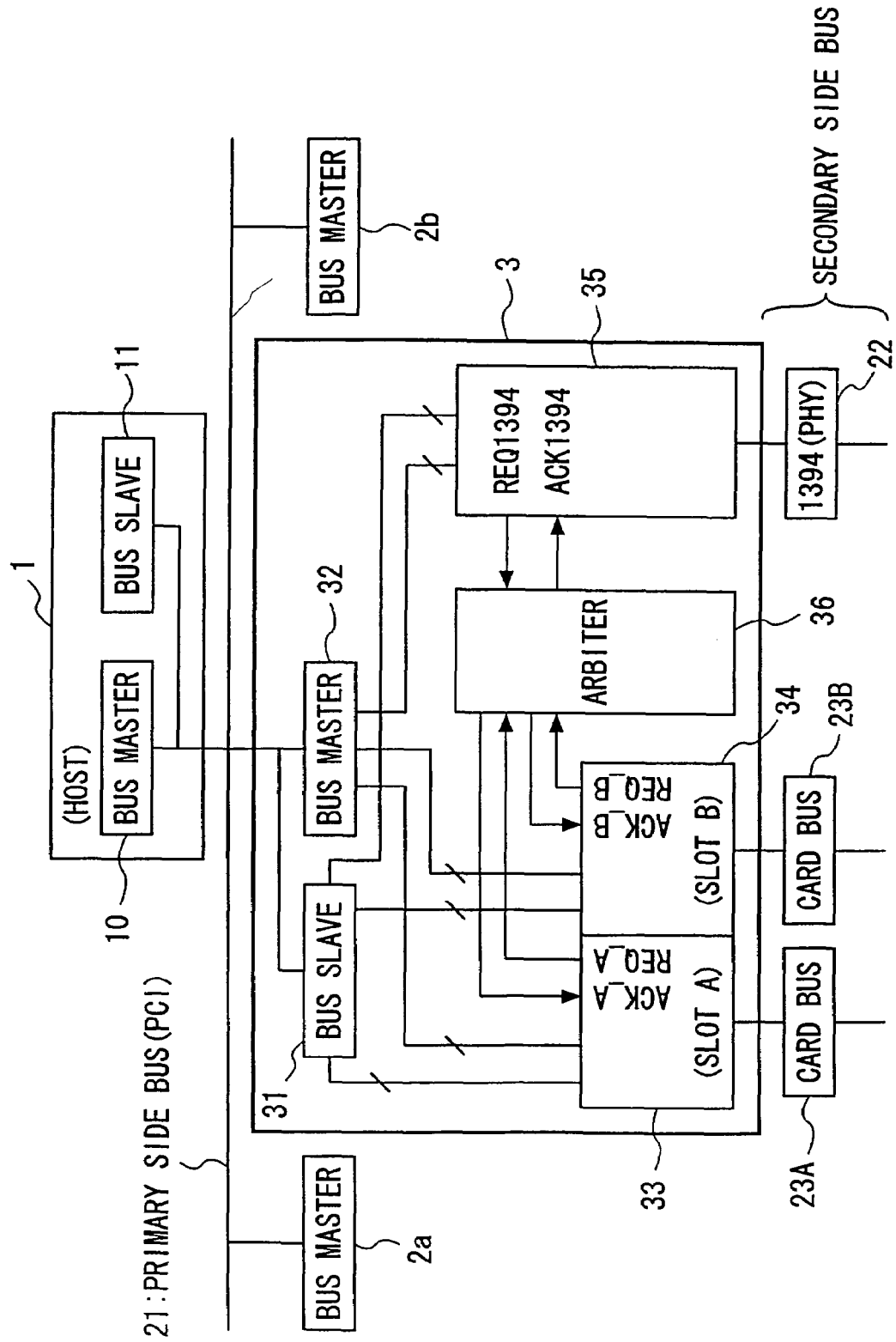
FIG. 1 is a block diagram of a bus bridge according to a first embodiment of the present invention.
Figure 2:
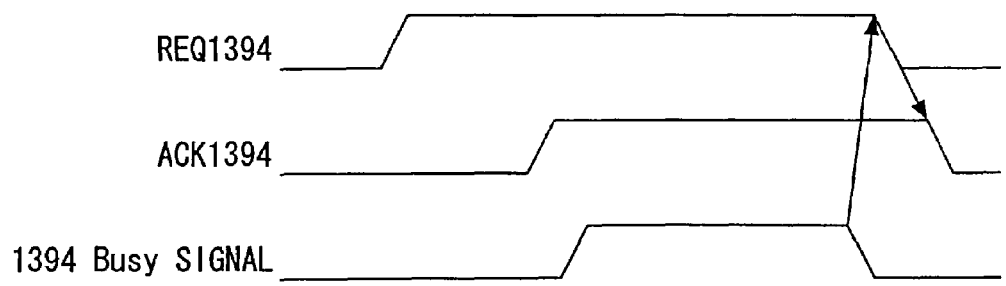
FIG. 2 is a timing chart of signals in the first embodiment of the present invention.

FIG. 1 is a block diagram of a bus bridge according to the first embodiment of the present invention. In FIG. 1, the bus bridge 3 corresponding to a bus master is connected to a primary side bus 21 which is a peripheral component interconnect (PCI) bus. Other bus masters 1a, 2b and 10 are also connected to the primary side bus 21. An IEEE1394 bus 22 is connected to an IEEE1394 block 35 provided in the bus bridge 3. The bus bridge 3 is also provided with two card-bus blocks 33 and 34 which have card slots A and B, respectively so that a card bus 23A is inserted into the card slot A and a card bus 23B is inserted into the card slot B. The IEEE1394 bus and the card buses 23A and 23b correspond to the secondary side buses.

Each of the card-bus blocks 33 and 34 serves as an interface in accordance with a card bus protocol. The IEEE1394 block 35 performs a bus controlling operation in accordance with the IEEE 1394 protocol, and also serves as an interface of the IEEE1394 bus. Accordingly, the bus bridge 3 shown in FIG. 1 supports both the PCI-card bus bridge function and the PCI-1394 (OHCI-Link) bridge function.

The bus bridge 3 includes an arbiter 36 that arbitrates when the access demands of the card bus blocks 23A and 23B and the IEEE1394 block 35 compete with each other.

A bus slave 31 and a bus master 32 are provided in the bus bridge 3. The data and address of the primary-side buses 21 are given from the bus slave 31 to the secondary-side bus. The data and address of the secondary-side buses 21 are given to the primary-side bus through the bus master 32. The data given to the primary-side bus 21 through the bus master 32 is taken by a host 1 through the bus slave 11. When an access demand CREQQ# is given from the card buses 23A and 23B, each of the card bus blocks 33 and 34 takes the access demand by the internal slave provided therein, and gives the access right to the arbiter 36. The arbiter 36 performs arbitration as described later, and outputs the acknowledgement ACK to the permitted card-bus block. The card-bus blocks 33 and 34 give enabling signal CGNT # from the master thereof to the card bus 23A or 23B based on the acknowledgement ACK obtained from the arbiter 36.

The card bus 23A and 23B give the address and data to the respective bus blocks 33 and 34 based on an enabling signal CGNT#. Then, the bus blocks 33 and 34 send the address and data to the primary side bus 21 through the bus master 32.

When the access demand REQ1394 is given from the 1394 (PHY) bus 22, the IEEE1394 block 35 outputs the access demand REQ1394 to the arbiter 36. When arbitration is done as described later and an access right is given to the 1394 (PHY) bus 22, the arbiter 36 outputs the acknowledgement ACK1394 to the IEEE1394 block 35. Then, the IEEE1394 block 35 gives the access right to the 1394(PHY) bus 22 based on the signal ACK1394 supplied by the arbiter 36. Accordingly, the 1394(PHY) bus 22 can sends the address and data to the primary side bus 21 based on the access demand REQ1394 through the IEEE1394 block 35 and the bus master 32.

As mentioned above, since the card buses 23A and 23B are connected (two card slots are provided in the bus bridge 3), there are three agents who can send the access demand REQ to the primary-side bus 21 from the secondary-side bus.

Generally, the arbitration refers to the mediation as to which master is given an access right when one bus is connected to a plurality of bus masters that compete with each other. However, in the present embodiment, the secondary-side buses are separate to each other, and, thereby, the secondary-side buses do not compete with each other. The arbiter 36 in the present embodiment mediates which becomes a bus master with respect to the primary side buses 21 when more than two of the three secondary-side buses lodge the access demand REQ at the same time.

If a priority is given to the IEEE1394 bus 22, which occupies the primary-side bus 21 for a long time, there may be a case in which the access right cannot be transferred to the card buses 23A and 23B or probability of transferring the access right to the card buses 23A and 23B is extremely lowered, which prevents a normal data transfer.

When more than two access demands REQs are supplied at the same time, a priority is not given to the IEEE1394 block 35, and the access right is given equally at the same rate with other blocks. Therefore, the arbiter 36 is provided with a counter so as to give the access right sequentially to the buses that have lodged the access demands REQs.

As a result, the acknowledgement ACK is supplied to the secondary-side buses equally at the same rate. Therefore, the access right is given sequentially to the secondary-side buses, and the arbiter 36 does not need a special circuit.

When the access right is given to the IEEE1394 bus 22 and when an operation is being performed through the IEEE1394 bus, the operation cannot be stopped due to the feature of the operation according to IEEE1394 until the operation according to the IEEE1394 is completed even if the access demand REQ is supplied from the card bus 23A or 23B.

Accordingly, when the IEEE1394 bus 22 is busy, the arbiter 36 is prevented from taking up the access right from the IEEE1394 bus 22. This can be achieved by inputting a busy signal representing the busy state of the IEEE1394 bus 22 to the arbiter 36 so as to monitor the busy signal by the arbiter 36. However, in the present embodiment, the busy signal representing the busy state of the IEEE1394 bus 22 is reflected in the access demand REQ. Specifically, the access demand IEEE1394 is lowered when the busy signal falls, and sequentially, the acknowledgement ACK1394 is lowered when the busy signal falls. Accordingly, the acknowledgement ACK1394 is continuously supplied until the access demand REQ1394 is withdrawn. Thus, when the IEEE1394 bus is busy, the access right given to the IEEE1394 bus 22 is not taken up without increasing the number of inputs to the arbiter 36.

Since each of the card buses 23A and 23B is an isolated bus besides the IEEE1394 bus 22, the acknowledgement ACK can be sent back to the card buses 23A and 23B. However, because the use right of the primary-side bus 21 is not given to the card buses 23A and 23B, the card buses 23A and 23B cannot transfer data. Therefore, it is necessary to make the card buses 23A and 23B to send the access demand again.

When the card bus is used as the secondary-side bus as is in the above-mentioned embodiment, signals CREQ# and CGNT# corresponding to the access demand REQ and the acknowledgement ACK, respectively, are input. Thus, the signals CREQ# and CGNT# may be input to the arbiter 36 instead of inputting the access demand REQ and the acknowledgement ACK. However, it should be noted that a car has to be taken since the polarities of the low and high levels are reversed.

Figure 3:
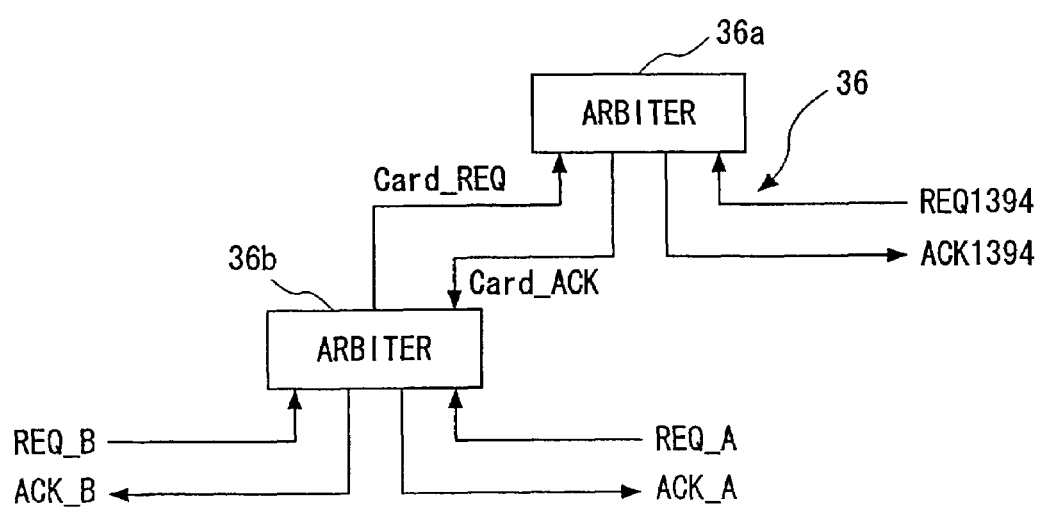
FIG. 3 is a block diagram of an arbiter according to the first embodiment of the present invention.

When the number of agents who lodge the access demand REQ is greater than three as in the above-mentioned embodiment, the circuit structure of the bus bridge 3 becomes complex. In order to simplify the circuit structure, the arbiter 36 is divided into two stages of a first arbiter 36a and a second arbiter 36b as shown in FIG. 3. The first arbiter 36a performs the arbitration of the access demands of the IEEE1394 bus 22 and the card buses 23A and 23B. The second arbiter 32b performs the arbitration of the access demands of the card buses 23A and 23B only at a time when Card-ACK is returned.

According to the above-mentioned structure of the arbiter 36, each of the arbiter 36a and 36b merely performs the selection of one from two. Therefore, the first arbiter 36a and the second arbiter 36b can be composed of the same circuit. At this time, Card-REQ can be simply generated by an OR operation of REQ-A and REQ-B.

However, according to the above-mentioned structure, the access right cannot be given to the three agents equally. Specifically, in the above-mentioned embodiment, the ratio of slot A:slot B:IEEE1394 becomes equal to the ratio 1:1:2.

Although some systems allow such a distribution of the access right, when a completely equalized distribution of the access right is desired, the distribution ratio of the first arbiter 36a must be such that the ratio of card bus to the IEEE1394 bus (card bus:IEEE1394) must be equal to 2:1. In order to achieve this scheme, a switch bit is merely provided to the internal register of the bus bridge. Moreover, there is no need to make a special arbitration circuit. For example, the arbitration circuit may give the access right to the IEEE1394 bus after giving the access right to the card buses twice.

In the above-mentioned bus bridge 3, malfunction may occur due to a collision on the primary-side bus when the access from the secondary-side bus is accepted during the arbitration of the secondary-side buses. In such a case, the access of the primary-side bus should not be retried (canceling the access without accepting the access at that time, and the same access is reissued later), and the current access of the primary-side bus should be given a highest priority. The reason for this is not to be able to give priority to the access of the secondary-side bus because it is uncertain what process is done by the bus master of the primary-side bus.

As for the operation of the arbiter 36, it is ideal not to return the acknowledge ACK to the secondary-side bus. However, there may be a case in which the arbiter has already sent the acknowledgement ACK to the card busses. In such a case, the card buses are rendered to send the access demand again. Alternatively, the access of the secondary-side bus can be accepted by setting separate paths to the process of the data path of the primary side and the data path of the secondary side.

However, since the primary-side bus is not in an idle state, the data to be transferred must be held in the bus master 2 of the bus bridge 3. In the case of the IEEE1394 bus, since the retry cannot be done on the secondary side, the access from the primary side is an access to the internal register. Thus, there is no need to separate the path used for the access.

It should be noted that the present invention can be applied also to the USB as a similar serial bus in accordance with IEEE1394.

The present invention is not limited to the specifically disclosed embodiments, and variations and modifications may be made without departing from the present invention.

The present invention is based on Japanese priority application filed on Jul. 5, 1999, the entire contents of which are hereby incorporated by reference.

What is claimed is:

1. An arbitration method of a bus bridge that interfaces a primary-side bus with a plurality of secondary side buses, the primary-side bus being a local bus in a system and the secondary side buses being external buses connected to the system, the bus bridge supporting a plurality of kinds of operations one of which is a serial bus operation in accordance with IEEE 1394, one of the second-side buses being a serial bus in accordance with IEEE 1394 and the rest of the secondary-side buses are card buses, the bus bridge having a first arbiter and a second arbiter, the first arbiter performing an arbitration granting equal access to each of the plurality of buses, the second arbiter performing an arbitration between the card buses and providing an input to the first arbiter, the arbitration method comprising the steps of:

when accessing the primary-side bus, and if access requests made by three bus masters including more than two kinds are issued through the secondary-side buses, performing an arbitration by said first arbiter granting equal access to each of the plurality of buses; and performing the same kind of arbitration by said second arbiter and inputting to the first arbiter an output of the second arbiter, thereby giving an access right equally to each of the secondary side buses.

2. The arbitration method of claim 1, wherein access rights are provided at a same rate of the lodged access demands.

3. The arbitration method of claim 1, further comprising the steps of:
   giving a priority right to the first secondary side bus; and
   maintaining the access right given to the first secondary side bus when an access demand is lodged from the other of the secondary side buses.

4. The arbitration method of claim 1, wherein the other of the secondary side buses include a plurality of card buses, and the arbitration method comprising the steps of:
   performing an arbitration between the first secondary side bus and the card buses when access demands are lodged from the first secondary side bus and the card buses; and
   performing an arbitration between the card buses when an access right is to be given to one of the card buses.

5. The arbitration method of claim 1, further comprising the step of changing an order of giving the access right.

6. The arbitration method of claim 1, further comprising the step of giving a highest priority to the primary-side bus when the primary-side bus lodges an access demand to the secondary side buses irrespective of a condition of arbitration between the secondary side buses.

7. An arbitration system, comprising:
   a bus bridge;
   a primary side bus; and
   a plurality of secondary side buses coupled to the primary side bus via said bus bridge, wherein a first secondary side bus is configured to perform a serial bus operation in accordance with IEEE 1394, one of the second-side buses is serial bus in accordance with IEEE 1394 and the rest of the secondary-side buses are card buses, the bus bridge having a first arbiter and a second arbiter, the first arbiter configured to perform an arbitration granting equal access to each of the plurality of buses, the second arbiter, configured to perform an arbitration between the card buses and provide an input to the first arbiter,
   said bus bridge being configured to arbitrate access rights requested by said secondary side buses when accessing the primary-side bus, and if access requests made by three bus masters including more than two kinds are issued through the secondary-side buses, performing an arbitration by said first arbiter granting equal access to each of the plurality of buses; and
   performing the same kind of arbitration by said second arbiter and inputting to the first arbiter an output of the second arbiter, thereby giving an access right equally to each of the secondary side buses.

8. The system of claim 7, wherein access rights are provided at a same rate of the lodged access demands.

9. The system of claim 7, wherein said bus bridge gives a priority right to the first secondary side bus and maintains the access right given to the first secondary side bus when an access demand is lodged from the other of the secondary side buses.

10. The system of claim 7, wherein the bus bridge performs an arbitration between the first secondary side bus and the card buses when access demands are lodged from the first secondary side bus and the card buses and performs an arbitration between the card buses when an access right is to be given to one of the card buses.

11. The system of claim 7, wherein said bus bridge changes an order of giving the access right.

12. The system of claim 7, wherein said bus bridge gives a highest priority to the primary-side bus when the primary-side bus lodges an access demand to the secondary side buses irrespective of a condition of arbitration between the secondary side buses.

13. The system of claim 7, wherein the first secondary side bus is a serial bus operating in accordance with IEEE1394.

* * * * *